(12) United States Patent
McRobert (10) Patent No.: US 7,717,065 B2
(45) Date of Patent: May 18, 2010

(54) AQUACULTURE

(76) Inventor: Ian McRobert, 148 Eleventh Road, Perth, Western Australia (AU) 6112

( * ) Notice: Subject to any disclaimer, the term of this patent is extended or adjusted under 35 U.S.C. 154(b) by 645 days.

(21) Appl. No.: 11/630,715

(22) PCT Filed: Jun. 24, 2005

(86) PCT No.: PCT/AU2005/000927

§ 371 (c)(1), (2), (4) Date: Jun. 11, 2007

(87) PCT Pub. No.: WO2006/000042

PCT Pub. Date: Jan. 5, 2006

(65) Prior Publication Data

US 2008/0029041 A1 Feb. 7, 2008

(30) Foreign Application Priority Data

Jun. 25, 2004 (AU) ............................ 2004903454

(51) Int. Cl.
*A01K 63/00* (2006.01)
(52) U.S. Cl. ..................................................... 119/226
(58) Field of Classification Search ................. 119/226, 119/223, 200, 211, 227, 224
See application file for complete search history.

(56) References Cited

U.S. PATENT DOCUMENTS

| 3,876,119 | A | * | 4/1975 | Lamkin | .................. 222/386.5 |
| 4,798,168 | A | | 1/1989 | Vadseth et al. | |
| 5,438,958 | A | * | 8/1995 | Ericsson et al. | ............. 119/223 |
| 5,540,521 | A | * | 7/1996 | Biggs | .......................... 405/59 |
| 5,762,024 | A | | 6/1998 | Meilahn | |
| 5,979,362 | A | * | 11/1999 | McRobert | ................... 119/227 |
| 7,168,442 | B1 | * | 1/2007 | McRobert | ................... 137/209 |

FOREIGN PATENT DOCUMENTS

| CA | 2075442 | 2/1994 |
| EP | 574589 | 12/1993 |

* cited by examiner

*Primary Examiner*—Yvonne R. Abbott
(74) *Attorney, Agent, or Firm*—Portland Intellectual Property, LLC (57) ABSTRACT

An aquaculture system (10) comprises one or more tanks (14) that are arranged to be disposed within a body of water such as a pond (12). A reticulation system (16) recirculates water from the pond (12) through the one or more tanks (14). Solid waste material including uneaten food is extracted from the tanks (14) and deposited at a location that is isolated from communication with the pond (16).

14 Claims, 9 Drawing Sheets

AQUACULTURE

FIELD OF THE INVENTION

The present invention relates to an aquaculture system.

BACKGROUND OF THE INVENTION

The standard method of growing fish in inland water bodies is in open ponds, either free range or in cages. Such ponds take advantage of the land resources particularly in rural areas, however, they may have disadvantages. Free-range fish grown in such ponds are difficult to observe, monitor and manage. For example, it is difficult to assess the feed intake of the fish, their health and growth rate. Harvesting fish from such a wide area is also difficult as either the pond needs to be drained (a process which may take many hours) or a large net dragged through the water. Predation by birds and water rats is also highly problematic. Arguably the greatest disadvantage is pollution of the water through nutrients from uneaten food and fish waste. The pollution typically limits the pond yields to 1-2 tonnes per hectare—particularly when water exchange rate through the pond is low.

Nutrients limit a pond's yield by encouraging blooms of microalgae. As nutrient input into the pond increases, so does the strength of the blooms. The bloom strips oxygen from the water at night time leading to many fish kills. If the bloom of microalgae gets too thick, the algae will die, sink to the bottom of the pond and again strip oxygen from the water. Solid waste excreted by the fish and uneaten food creates a sludge on the bottom of the pond that also depletes valuable oxygen. This sludge further complicates the net harvesting process because as the net is dragged through the pond it stirs up the sludge, further depleting oxygen and killing fish.

In an effort to overcome some of the disadvantages of open pond culture, people often contain fish within net cages. That overcomes the problems of harvesting, predation and fish management. Nevertheless yields are still limited by nutrient input into the pond and in the case of bloom induced oxygen depletion, fish are actually worse off in cages, as the fish are crowded together and oxygen starvation therefore occurs rapidly. The density of the fish in these cages is limited to approximately 10 kg/m$^3$.

SUMMARY OF THE INVENTION

According to one aspect of the invention there is provided an aquaculture system comprising:
a body of water;
a liquid-impervious receptacle disposed within the body of water; and,
a water reticulation system that re-circulates water from the body of water through the receptacle and back to the body of water.

According to another aspect of the invention there is provided an aquaculture system comprising:
an aquaculture system comprising:
a liquid-impervious receptacle provided with a buoyancy apparatus to enable the receptacle to float in a body of water. In this aspect the system may further comprise:
a water reticulation system that re-circulates water from a body of water in which the receptacle floats, through the receptacle and back to the body of water.

Preferably the water reticulation system comprises a water inlet that directs water entering the receptacle in a manner to generate a substantially circular flow of water in the receptacle.

Preferably the water inlet comprises a conduit provided with at least one opening that directs water substantially tangentially to an upright inside surface of the receptacle.

Preferably the conduit comprises a vertical manifold where the opening is one of a plurality of openings in the manifold directing water substantially tangentially to the inside upright surface of the receptacle.

Preferably the receptacle comprises a discharge opening at a level in the receptacle above a surface level of the water in the body. Accordingly, the receptacle is filled with water from the body of water by the water re-circulation system to a level to produce a head of water in the receptacle relative to the body of water.

Preferably the reticulation system comprises a water displacement apparatus that displaces water from the body into the receptacle.

Preferably the water displacement apparatus comprises an air pump that air lifts water from the body of water to the receptacle.

Preferably the water displacement apparatus further comprises a conduit providing fluid communication between the body of water and the receptacle and where the pump is in fluid communication with the conduit at a location below the surface of the water in the body.

Preferably the aquaculture system further comprises a waste extraction system that draws solid waste from water within the receptacle and feeds the waste to a waste separator.

Preferably the waste extraction system comprises a waste pipe having an opening near a bottom inside surface of the receptacle through which water and waste can be drawn to the waste separator.

Preferably the waste separator comprises a gravity separator.

Preferably the gravity separator is a cyclone separator.

Preferably the waste separator comprises a water outlet fed from an upper portion of the separator through which water within the separator is discharged from the separator and returned to the body of water.

Preferably the waste separator comprises a waste removal conduit in communication with a lower portion of the separator through which solid waste collected in the separator can be removed, and a pump apparatus to pump the solid waste through the waste conduit to a location isolated from fluid communication with the pond.

Preferably the waste removal system further comprises a sensor for sensing when solid waste in the separator reaches a set quantity and automatically operating the pump apparatus to pump the solid waste through the conduit to the location.

Preferably the receptacle has a circular cross-section.

Preferably the receptacle comprises buoyancy apparatus for floating the receptacle within the body of water.

In one embodiment the receptacle comprises an outer structure that may be in the form of rigid shell for example made of fibre glass, plastics or metal, or alternatively in the form of flexible sheet of material.

Preferably the receptacle further comprises an invertable liner within the outer structure.

BRIEF DESCRIPTION OF THE DRAWINGS

An embodiment of the present invention enables grant of way for example only with way of reference to the accompanying drawings in which.

DETAILED DESCRIPTION OF PREFERRED EMBODIMENT

Figure 1:
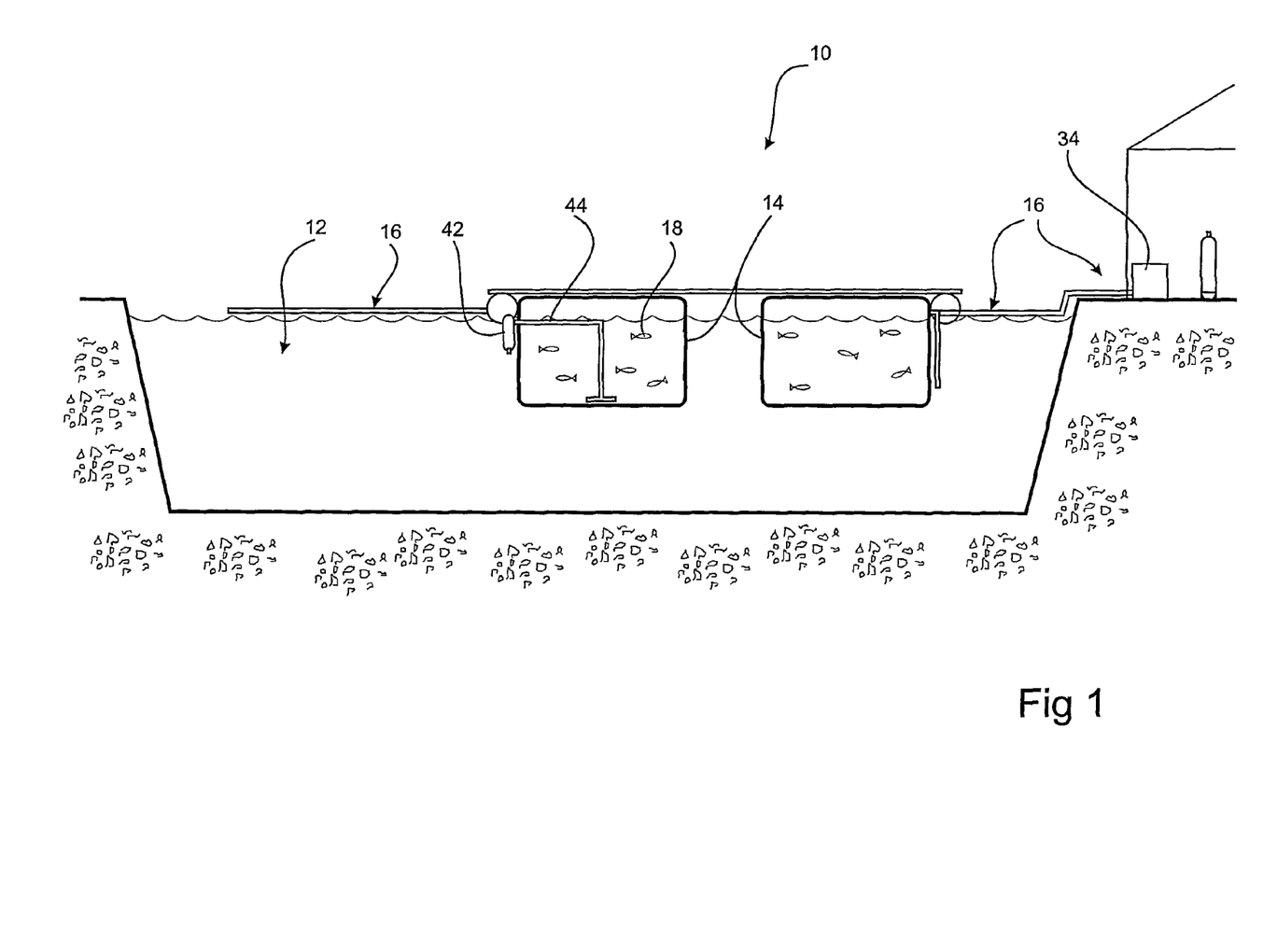
FIG. 1 is a schematic representation of an embodiment of the aquaculture system in accordance with the present invention.
Figure 2:
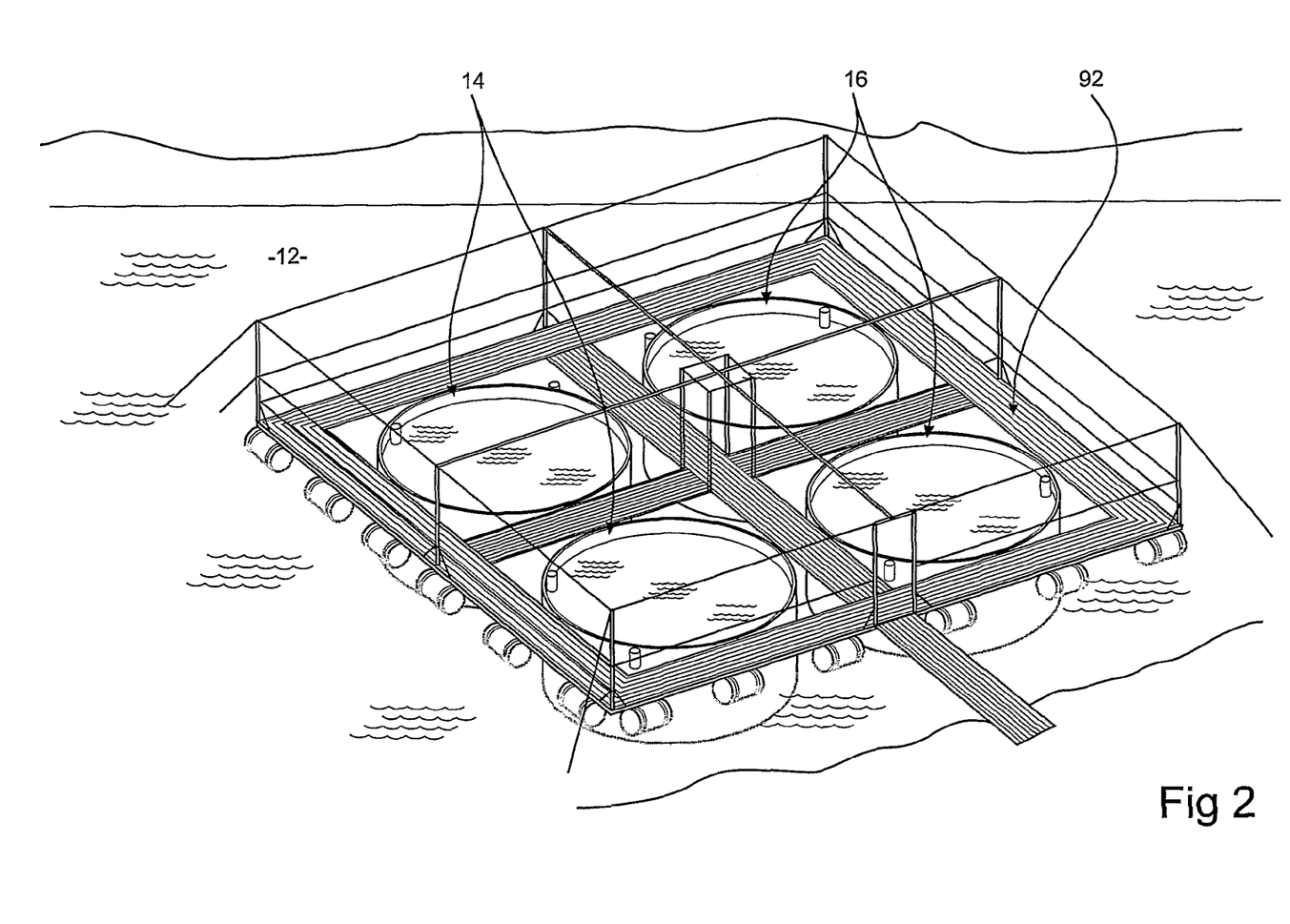
FIG. 2 is a representation of an embodiment of the aquaculture system.

Referring to the accompanying drawings and in particular FIGS. 1 and 2, an embodiment of an aquaculture system 10 in accordance with the invention comprises a body of water such as a lake, estuary, ocean or pond 12 (hereinafter referred to in general as "pond 12") in which is disposed a number of liquid impervious receptacles in the form of tanks 14. While the accompanying drawings depict the use of a number of tanks 14 alternative embodiments of the aquaculture system 10 may function with a single tank 14. The aquaculture system 10 further comprises a reticulation system 16 that re-circulates water from the pond 12 through the tanks 14. It will be appreciated from the following description that the reticulation system 16 is not a single item but an ensemble of pipes, conduits and a water displacement device or apparatus such as a pump or blower.

In broad terms, the aquaculture system 10 operates by maintaining aquatic animals such as fish 18 within the tanks 14 and circulating water form the pond 12 through the tanks 14. A substantial proportion of the solid waste produced by the fish 18 and uneaten food is extracted from the receptacles 14 and deposited at a remote location. The remote location is isolated from fluid communication with the pond. As explained below this could constitute depositing the waste on land outside of the pond, or in tanks or sumps either being land-based or held within the pond for subsequent discharge at a location remote from the pond.

Figure 3:
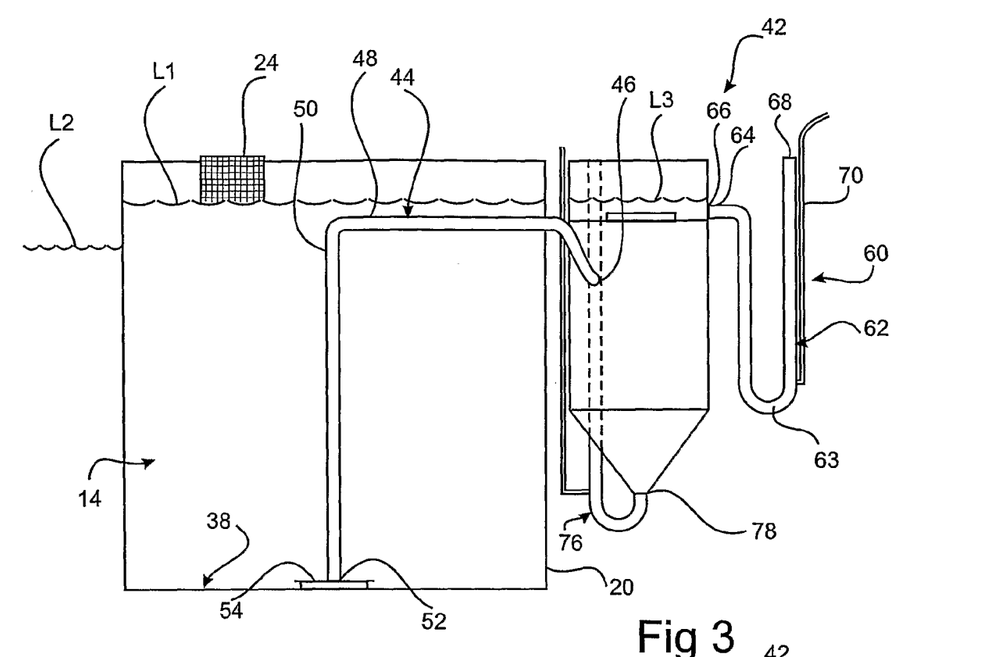
FIG. 3 is a schematic representation of a receptacle and waste removal system incorporated in the aquaculture system.

Each tank 14 has a (rigid) outer structure such as a shell 20 that typically would be made from fibre-glass although can be made from other materials such as plastics or suitably coated or galvanized steel. Floats 22 are attached to the tanks 14 to enable them to float within the pond 12. The tanks 14 when filled with water from the pond 12, are filled to a level L1 (refer FIG. 3) which is higher than the water level L2 in the pond 12. This creates a head H of water within the tank 14. The head H is typically in the order of 100 milimetres. This is created by providing an outlet 24 at an appropriate level or position in the tank 14 to produce the required head H.

Figure 8:
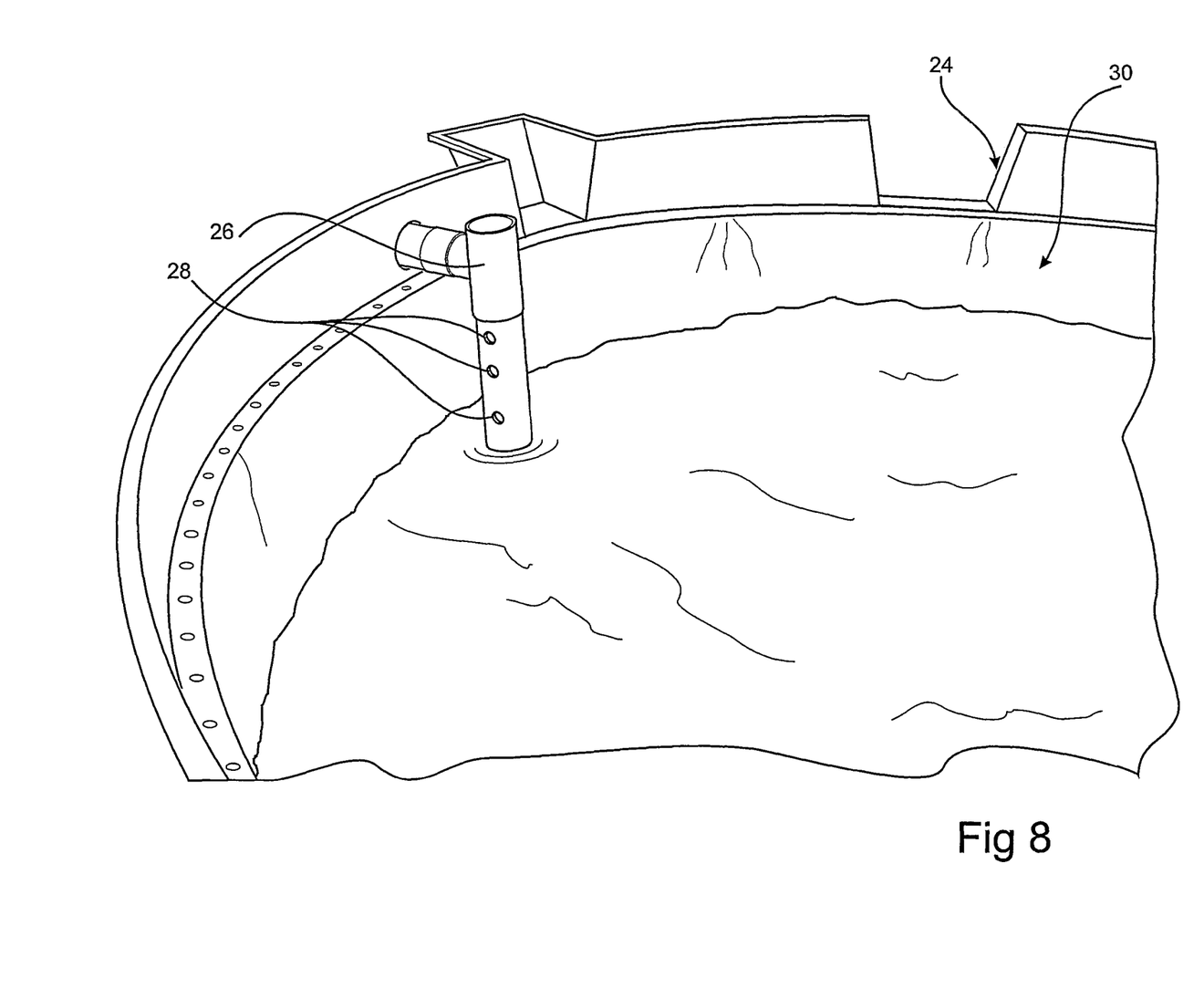
FIG. 8 is a representation of the inside of a receptacle incorporated in the aquaculture system near filling.
Figure 9:
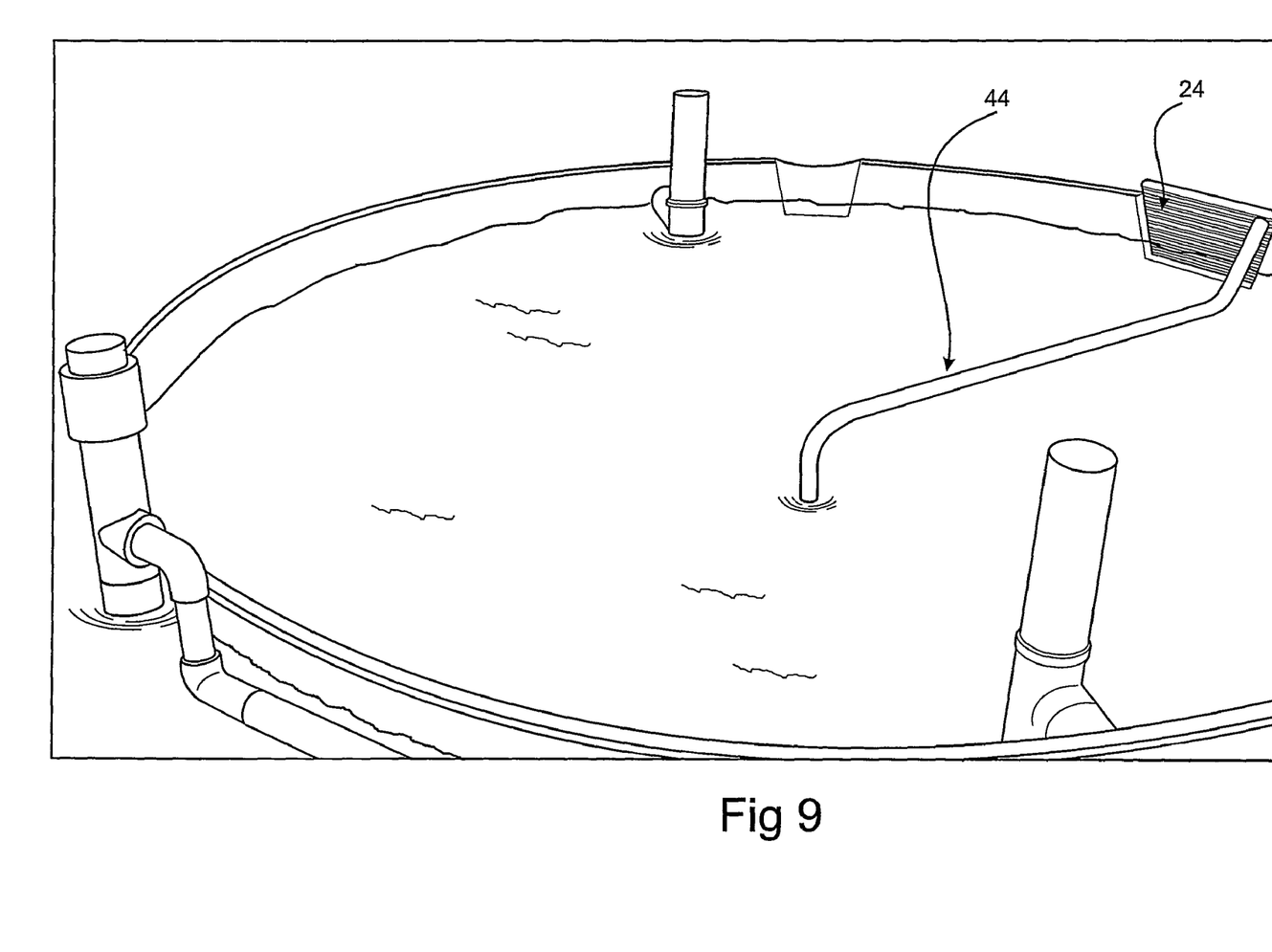
FIG. 9 is a representation of the tank depicted in FIG. 8 in a filled state; and, FIG. 10 is a representation of the embodiment of the receptacle depicting its liner in an inverted state.

The reticulation system 16 comprises a water inlet in the form of a manifold 26 that directs water entering the tank 14 in a manner to generate a substantially circular flow of water within the tank 14. In the present embodiment this is achieved by forming the manifold 26 as a vertical pipe having a plurality of openings 28 that direct water substantially tangentially to an upright inside surface 30 of the tank 14 (see in particular FIGS. 5 & 8).

Water from the pond 12 is directed into the manifold 26 by an external pipe or conduit 32 that is connected at one end to the manifold 26 and is open at a lower end below the water level L2 of the pond 12. While a pump can be used to pump water from the pond 12 into the conduit 32 it is preferred that the water be displaced from the pond 12 into the tank 14 via an air lift system which incorporates an air blower 34 (see FIG. 1) that directs air via a hose 36 into the conduit 32. As the air bubbles up through the conduit 32, it lifts water within the conduit 32 causing it to flow into the inlet/manifold 26 and thus into the tanks 14. Ideally, the blower 34 is maintained continuously in an ON state so that water from the pond 12 is continuously displaced into the tanks 14. Water within the tank 14 above the level of the discharge opening 24 is returned to the pond 12. This water can be returned directly to the pond 12 at the point of the discharge (or overflow) opening 24. Alternatively, the water from the discharge opening 24 can be channeled into a pipe or hose that returns the water into the pond 12 at location remote from the tanks 14.

Solid matter such as uneaten food and fish faeces will, by the combined action of gravity and centripetal force generated by the circular flow of water, congregate on a bottom surface 38 of the tank 14 and in particular be drawn toward the centre of the bottom surface 38.

A waste extraction system 40 operates to remove the solid waste from the tanks 14. The waste extraction system 40 comprises a gravity separator 42 mounted on an outside of the tank 14. The separator 42 is more particularly in the form of a cyclone or swirl separator. A waste pipe 44 is coupled at one end to an inlet 46 on the separator 42 and extends for a first length 48 substantially horizontally below the water level L1 within the tank and then extends for a second length 50 substantially vertically along a central axis of the tank toward the bottom surface 38. A lower end 52 of the length 50 is open and has coupled to it a circular flange 54 that is held above the bottom 38 by a number of short legs 56. The creates a waste collection region 58 between the flange 54 and the bottom 38 of the tank 14.

An air lift 60 is coupled with the separator 42 to draw water from the tank 14 through the separator 42 via the waste pipe 44. The air lift 60 comprises a conduit 62 that is in the general shape of a letter "U" with one end 64 coupled to a water outlet 66 of the separator 42 formed at a level below the normal water level L1 of the tank 14. An opposite end 68 of the conduit 62 is open and returns water to the pond 12. This may occur at a location adjacent the separator 42 or alternatively the end 68 may be coupled to a hose to discharge the water back into the pond at a remote location from the separator 42 and associated tank 14. An air hose 70 is connected to the length of the conduit 62 containing the end 68 at a location above the "U" bend 63 of the conduit 62 but below the water line L2. The air hose 70 provides fluid communication with the air blower 34.

Figure 4:
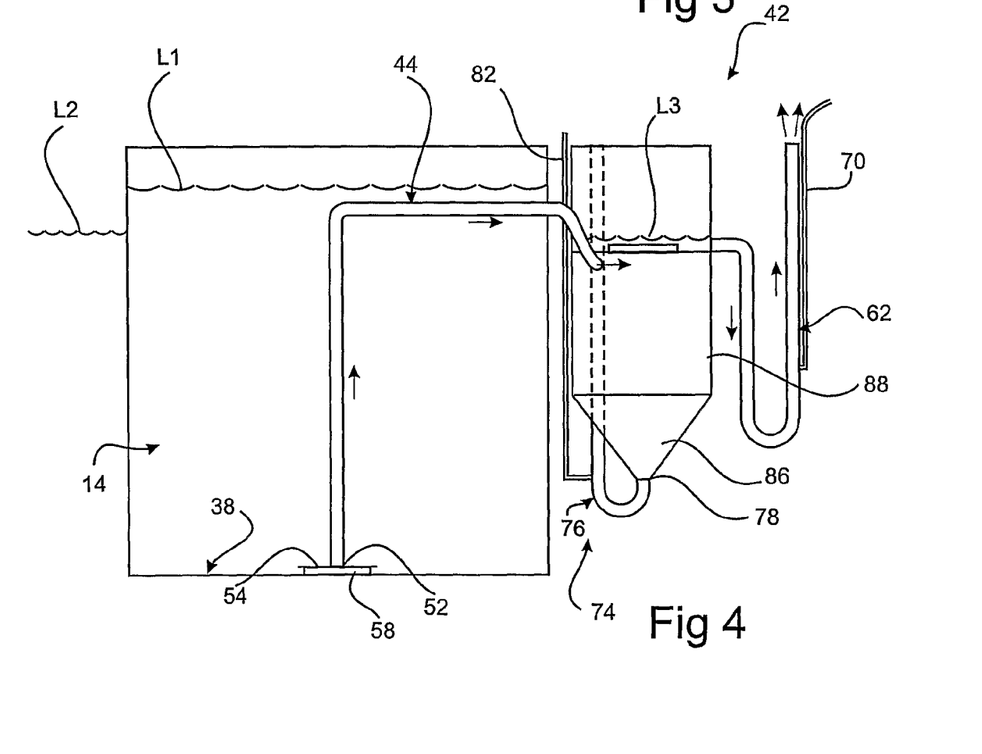
FIG. 4 is a further view of the receptacle and waste extraction system shown in FIG. 3 but in an alternative state of operation.

When no air is delivered to the hose 70, a water level L3 within the separator 42 is substantially equalised with the level L1 and the tank 14. Thus there is no substantial transfer in water from the tank 14 to the separator 42. However when the air lift 60 is ON air is pumped through the hose 70 to the conduit 62, the air bubbles up through the conduit 62 being discharged from the end 68 and displacing with it water contained within that part of the conduit. This generates a flow of water from the separator 42 through the conduit 62 resulting in a drop in the water level L3 relative to the water level L1 in the tank 14, as shown in FIG. 4. As a consequence, water is drawn from the tank 14 through the waste pipe 44 to the separator 42. This flow of water is drawn in from beneath the flange 54 and carries with it solid waste deposited on the bottom 38 of the tank 14. As the inlet 46 is below the outlet 66 solid matter contained within the water drawn into the separator 42 will by and large settle to the bottom of the separator 42. Further, the water as it enters through the inlet 46 does so tangentially to an inside surface of the separator 42 resulting in a circular flow of water which assists in separating the solid matter from the water. Water at or above the level of the outlet 66 is drawn through the conduit 62. A baffle or plate 72 is supported within the separator 42 in a vertical plane at a level substantially equal to the level of the outlet 66. This further assists in preventing solid waste matter from being discharged through the opening 66.

Figure 5:
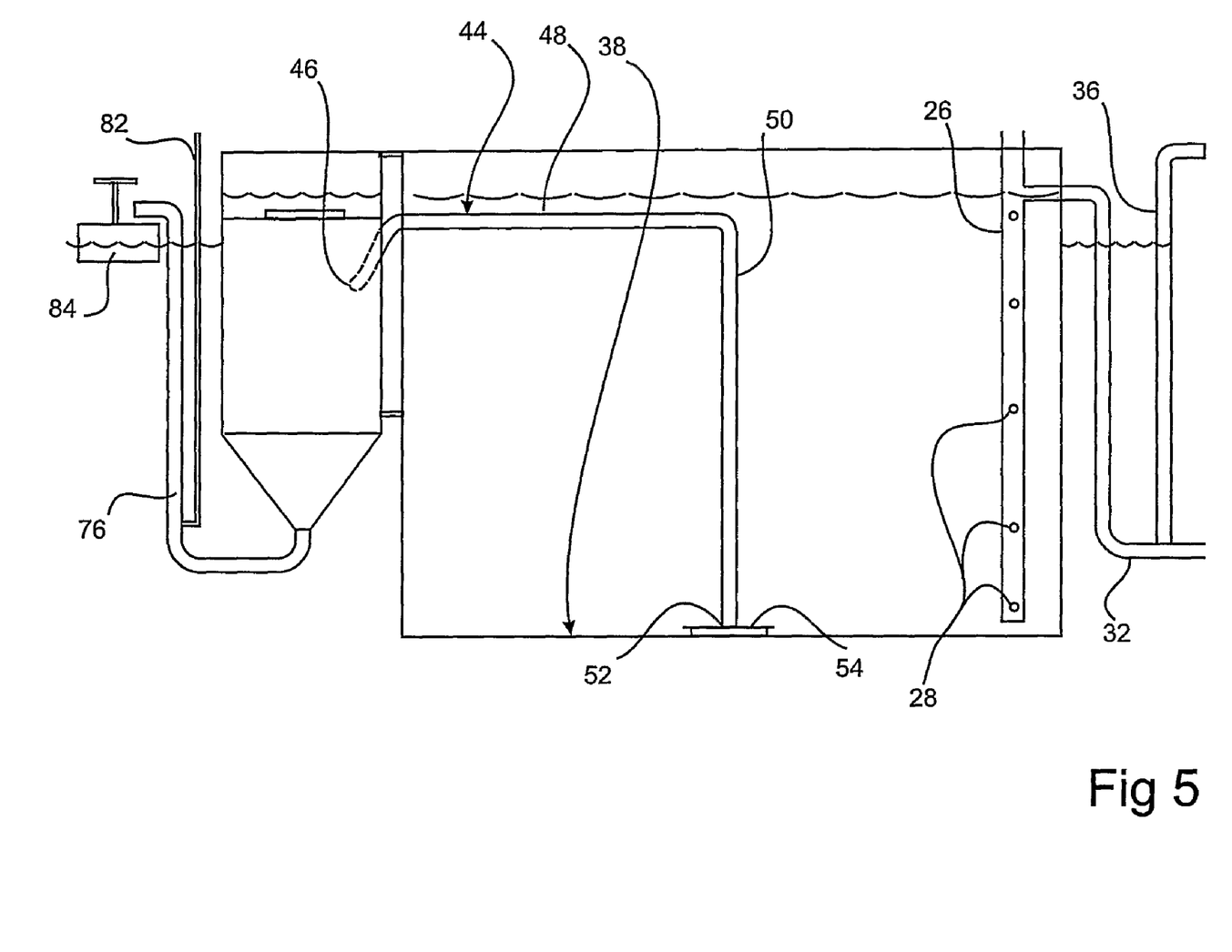
FIG. 5 is a schematic representation of the receptacle and waste extraction system in a waste extraction mode.
Figure 6:
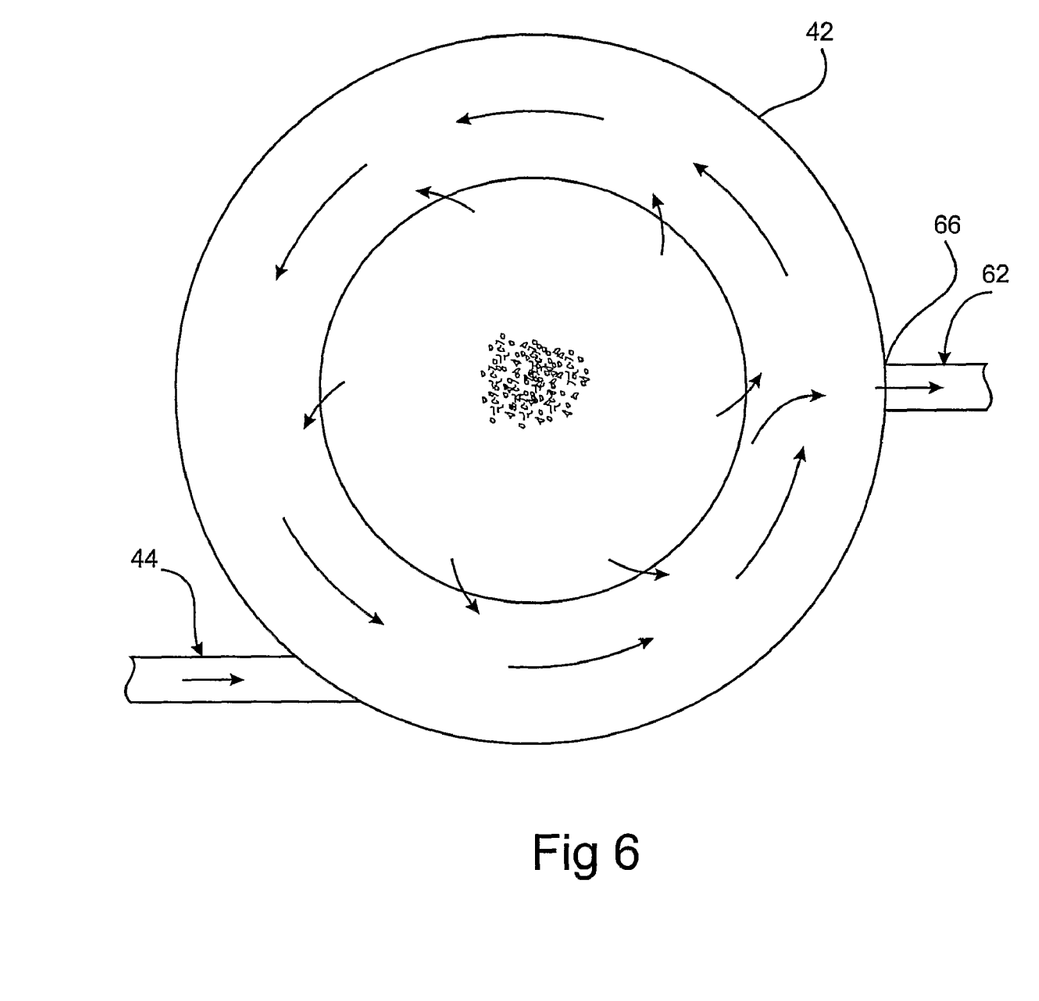
FIG. 6 is a plan view of the waste extraction system incorporated in the aquaculture system.
Figure 7:
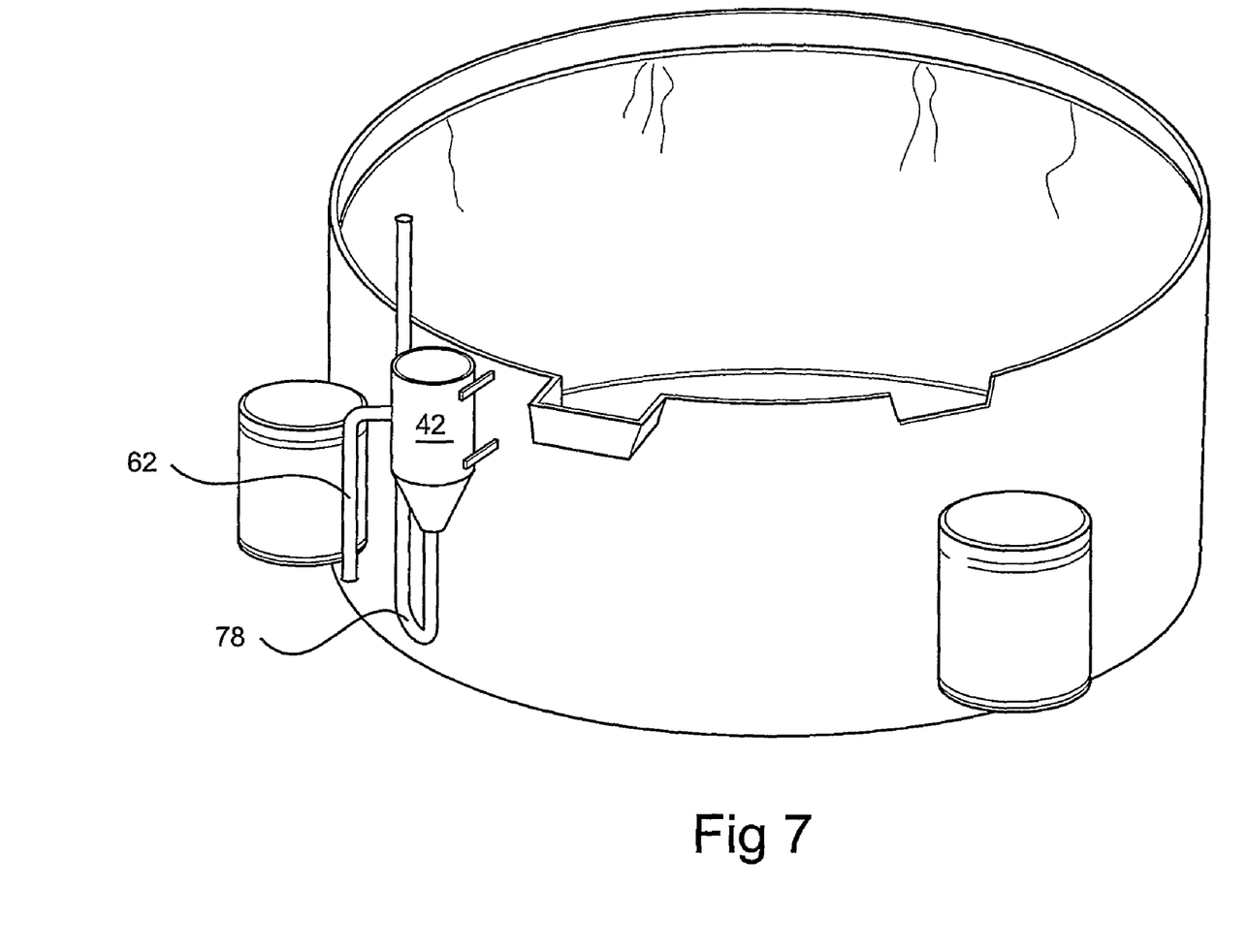
FIG. 7 is a representation of an embodiment of a receptacle incorporated in the aquaculture system.

In order to discharge the waste matter accumulated within the separator 42, a second air lift 74 is coupled with the separator 42. The air lift 74 comprises a conduit 76 which is coupled to a waste discharge opening 78 at a lower end of the separator 42. The conduit 76 is generally in the shape of a letter J having a U bend 80 attached to the waste discharge opening 78. A hose 82 is in fluid communication at one end with the blower 34 and at an opposite end with the conduit 76 at a location above the U bend 80. When air is delivered through the hose 82 to the conduit 76, the water bubbles up through the conduit 76 displacing water contained therein. This causes a flow of water from the separator 42 through the waste discharge opening 78 and through the conduit 76. This flow carries with it sludge and other waste material collected within the separator 42. An end of the conduit 76 distant the waste discharge 78 may lead to a floating waste collection box 84 as shown in FIG. 5. Alternatively, the conduit 76 may be coupled with a reticulation system which delivers the waste material to a location remote of the pond 12. The waste matter can then be further processed for example to produce fertilizer or methane. The separator 42 has a lower frusto-conical portion 86, and an upper cylindrical portion 88. Frusto-conical portion 86 assists in generating a circular flow of water within the separator 42 when solid waste is being discharged. Only a small percentage of the pond water is passed through the waste discharge 78 and conduit 76 to minimise water loss. This loss may be further reduced by treatment of the waste to separate as much water as possible from the solid waste. This water can then be treated and returned to the pond 12.

The structure and operation of the aquaculture system 10 is summarised as follows. Firstly, the tanks 14 provide an isolated environment within the pond 12 within which to grow fish or other marine animals 18. In this regard, the tanks 14 are impervious so that water cannot freely flow through the surface area of the receptacle between the pond 12 and the inside of the tank 14. Additionally, as a consequence, substantially all of the solid waste generated during the aquaculture process is isolated from the pond water. By delivering air through the pipe 36, water from the pond 12 is air lifted into the tank 14 and generates a circular flow of water within the tank 14. The flow of air is continuous so that water is being continually delivered into the tank 14. As the water level rises above the level of the opening 28, overflow water is delivered back into the pond 12. Due to the action of gravity and the circular flow of water within the tank 14, the water discharged from the opening 28 contains only at most a very small percentage of dispersed solid waste material. The bulk of the waste material settles to the bottom 38. Air can be continuously delivered to the first air lift 60 which causes a flow of water from the bottom 38 of the tank 14 into the separator 42 via the waste pipe 44. Substantially all of the solid waste material is entrained within this flow of water. The solid waste material is separated by the separator 42 from the water and settles to the bottom of the separator 42. Overflow water created during this process from the separator 42 is delivered back into the pond 12 and again substantially free of waste matter. Accumulated solid waste and sludge can be removed from the separator from time to time by operation of the second air lift 74. This waste matter may be delivered to floating sludge boxes 84, or more preferably discharged at a location remote of the pond 12. A sensor can be provided to detect when the solid matter or sludge reaches a predetermined quantity, for example weight, volume or height within the separator 42 to automatically operate the second air lift 74 to discharge the waste.

The system 10 combines a positive attributes of both standard pond based aquaculture systems and land based tank systems. In particular, the system enables the removal of substantially all waste products minimising the regeneration of algae blooms thereby providing substantially greater yields. Modelling on a prototype system suggests pond yields in the order of 10-15 tonnes/hectare are achievable.

Figure 10:
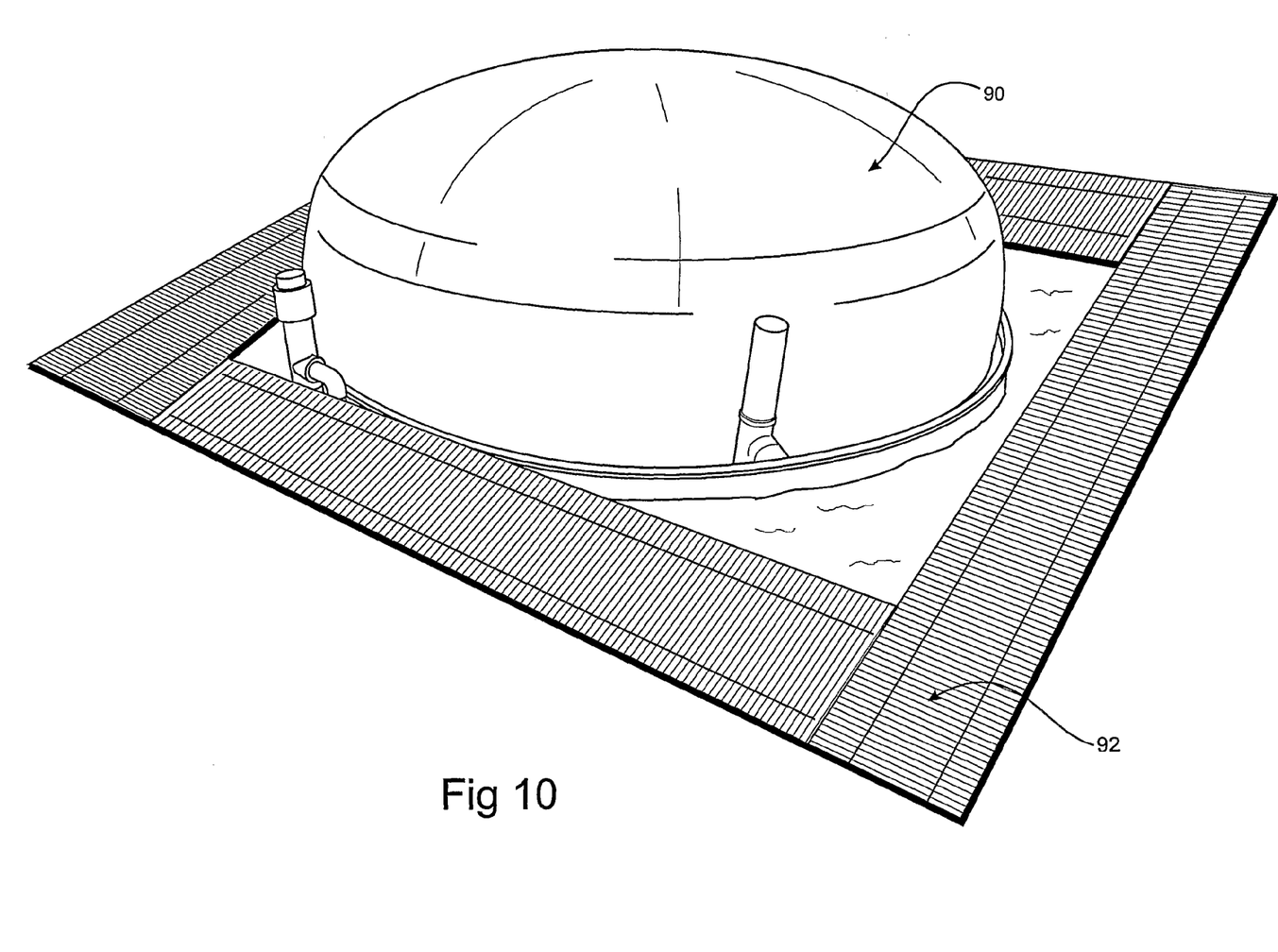

The system 10 may be further enhanced by providing each tank 14 with an invertable liner 90 as depicted in FIG. 10. The provision of the invertable liner 10 facilitates automatic channelling of the fish between respective tanks via channels (not shown) providing fluid communication between the tanks. Additionally, the inversion of the liner 90 enables easy cleaning of the liner. The liner 90 may be inverted by pumping of air via the blower 34 between the liner 34 and the inside surface of the tank in which it is disposed. Further details of the operation of this liner are set out in Applicant's U.S. Pat. No. 6,195,812 the contents of which are incorporated here by way of reference.

Now that an embodiment of the invention has been described in detail it will be apparent to those skilled in the relevant arts that numerous modifications and variations may be made without departing from the basic inventive concepts. For example the aquaculture system 10 may comprise any number of tanks or receptacles 14. Additionally, while the system describes the use of an air pump or blower 34 to generate the required flows of water this may be achieved by a conventional water pump. The system 10 may also comprise a floating pontoon arrangement 92 as depicted in some of the accompanying Figures to enable operators to easily attend to the operation of the system and animal husbandry. Further the receptacles need not comprise a rigid outer structure or shell 20. Rather one or more receptacles may comprise a flexible fluid impervious sheet of material such as PVC or other plastics materials. In the case of a receptacle with a liner 90, the receptacle would comprise two flexible fluid impervious sheets of material, one nested within the other. Also the waste pipe 44 need not have the specific shape and configuration as depicted, namely a horizontal length 48 and vertical length 50, rather it could simply extend diagonally from the side wall of the tank 14. In addition the sensor for monitoring the build up of waste within the separator 42, can be replaced with a simple timer to cause discharge of the waste through conduit 76 on a programmed time basis. For example every two hours the timer operates the air lift 74 for ten minutes to remove solid waste from the tank 14.

All such modifications and variations are deemed to be within the scope of the present invention the nature of which is to be determined from the above description and appended claims.

The invention claimed is:

1. An aquaculture system comprising:
   one or more a liquid-impervious receptacles that are adapted to float in a body of water, at least one of the receptacles comprising a side wall and a liner that is movable between a lining position where it lines an inside surface of a side wall and an inverted position where the liner is lifted from the inside of the side wall; and,
   a water reticulation system that re-circulates water from a body of water in which the or each receptacle floats, through the or each receptacle, and back to the body of water.

2. The aquaculture system according to claim 1 wherein the water reticulation system comprises an air pump or air blower that air lifts water from the body of water to flow into the or each receptacle.

3. The aquaculture system according to claim 2 wherein the air pump or air blower is operable to selectively deliver air to a region between the side wall and the liner to move the liner from the lining position to the inverted position.

4. The aquaculture system according to claim 2 further comprising an air lift driven waste extraction system that generates a flow of water from the receptacle, wherein waste matter is entrained within the flow of water.

5. The aquaculture system according to claim 4 wherein the waste extraction system further comprises a waste removal conduit in fluid communication with the separator at a location below the first location through which waste collected in the separator can be removed.

6. The aquaculture system according to claim 5 wherein the waste removal system further comprises a third conduit in communication with the waste conduit for delivering air to the waste conduit in a manner to produce an air lift of water in which said waste material is entrained.

7. The aquaculture system according to claim 4 wherein the waste extraction system comprises:
   a separator;
   a waste pipe in fluid communication between the receptacle and the separator; and,
   an air lift system that air lifts water from the separator to generate a head of water between the receptacle and the separator thereby causing the flow of water from the receptacle to the separator.

8. The waste extraction system according to claim 7 wherein the waste pipe has an opening near a bottom inside surface of the receptacle and communicates with the separator at a first location that is below a normal operating water level of the receptacle.

9. The waste extraction system according to claim 8 wherein the air lift system comprises a first conduit having one end in fluid communication with the separator at a second location above the first location, and an opposite end opening at a location outside of the receptacle; and, a second conduit providing air to the first conduit at a location below the first end of the second conduit.

10. The aquaculture system according to claim 9 wherein the waste extraction system further comprises a baffle at a location between the first and second locations.

11. The aquaculture system according to claim 7 wherein the airlift system derives air from the air pump or air blower.

12. The aquaculture system according to claim 1 wherein the water reticulation system further comprises a water inlet that directs water entering the or each receptacle in a manner to generate a substantially circular flow of water about a central vertical axis of the or each receptacle.

13. The aquaculture system according to claim 1 wherein the or each receptacle comprises a discharge opening disposed at a level in the or each receptacle above a surface level of the water in the body of water.

14. The aquaculture system according to claim 1 further comprising a body of water in which the or each receptacle floats.

* * * * *